March 23, 1948.   H. G. RENNER   2,438,413
LOW-PRESSURE TIRE SIGNAL
Filed May 15, 1944
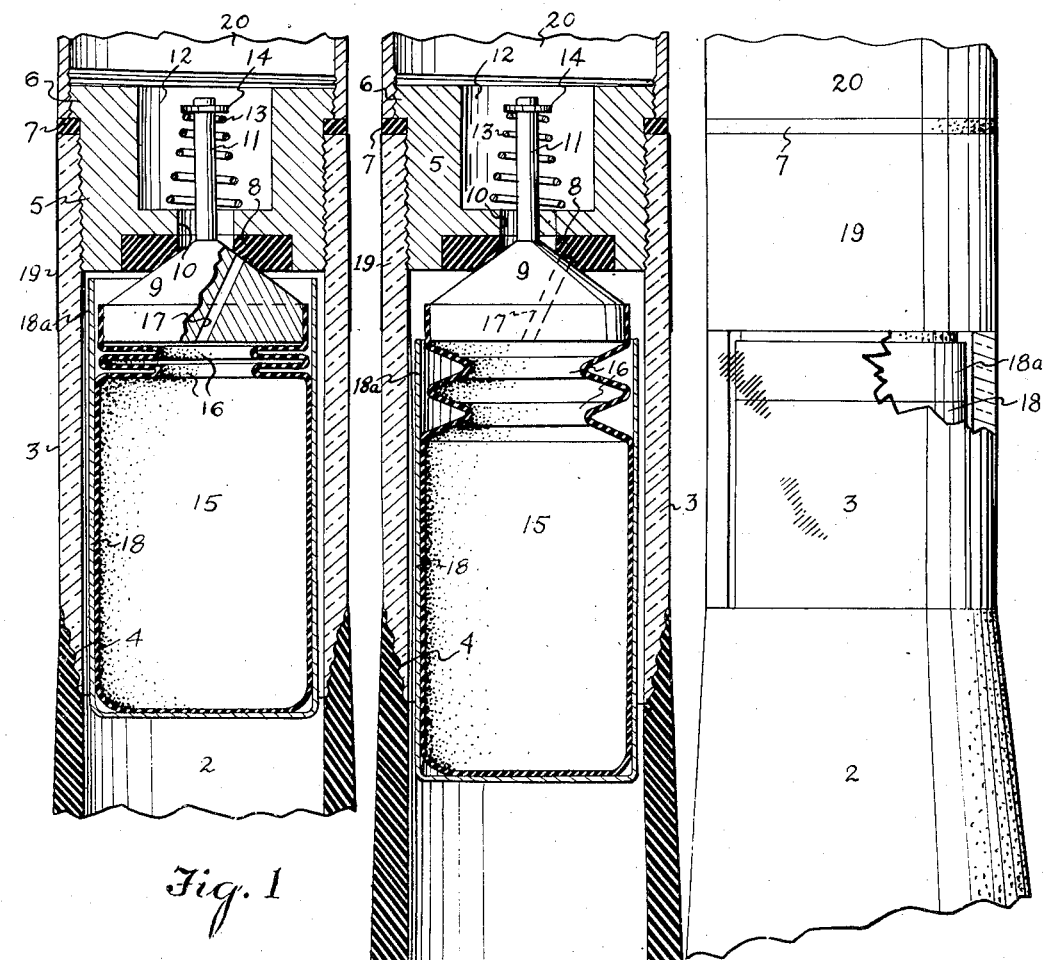
Fig. 1
Fig. 2
Fig. 3
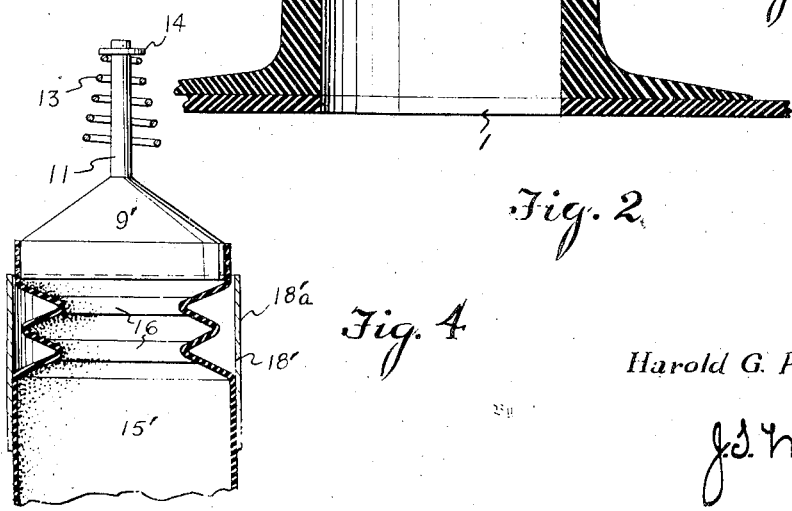
Fig. 4
Inventor
Harold G. Renner
J. S. Murray
Attorney Patented Mar. 23, 1948

2,438,413

UNITED STATES PATENT OFFICE 2,438,413

LOW-PRESSURE TIRE SIGNAL

Harold G. Renner, Detroit, Mich.

Application May 15, 1944, Serial No. 535,679

22 Claims. (Cl. 116—34)

This invention relates to low pressure indicators for tires and particularly indicators carried by the valve stems of tires.

An object of the invention is to dispose a low pressure indicator within the valve stem of a tire and to form at least a portion of the stem of transparent material so that indications may be observed.

Another object is to form a tubular portion of a valve stem of transparent material to permit observation of a low pressure indicator disposed within the stem, and to further utilize such portion as a mounting for the valve.

A further object is to dispose within a tire valve stem an expansible chamber confining air at a pressure normally balanced by that within the stem, a predetermined expansion of such chamber being induced when the tire pressure drops predeterminedly and such expansion being used to actuate a signal.

A further object is to provide said expansible chamber with an air admission passage and to control such passage by a valve also controlling air delivery to the tire.

A further object is to locate within a valve stem a normally hidden low pressure signal element, to provide the stem with a transparent window portion, and to adapt the signal element to be moved into registration with or be otherwise exposed through the window upon a predetermined drop of tire pressure.

These and various other objects are attained by the construction hereinafter described and illustrated in the accompanying drawing, wherein:

Fig. 1 is an axial sectional view of a valve stem equipped with the low pressure indicator showing the latter as positioned when tire pressure is normal.

Fig. 2 is a similar view showing a low pressure indicating position of the indicator.

Fig. 3 is an exterior view of the stem with the indicator signaling low pressure.

Fig. 4 is a view of a slightly modified indicator unit.

In these views, the reference character 1 designates a pneumatic tire equipped with a tubular valve stem 2, it being preferred to form the main body of such stem of rubber as is common. A tube 3 of transparent material such as a suitable plastic forms the outer end portion of the stem, being vulcanized or cemented to the rubber body and preferably being to some extent inserted in such body, as indicated at 4. Inserted and preferably screw threaded in the outer portion of the tube 3 is a valve carrier 5 having an annular flange 6 between which and the tube end, a gasket 7 is compressed. Set into the inner face of the carrier 5 is an annular valve seating annulus 8 formed preferably of rubber, such annulus being engaged by a conical valve member 9 controlling a port 10 formed axially of the carrier. Through said port projects a pin 11 rigidly carried by the valve member, such pin extending into a chamber 12 inwardly opening in the carrier, and a spring 13 coiled in said chamber bears outwardly on an abutment 14 on the pin to hold the valve member normally firmly seated.

Carried and closed by the valve member 9 and elongated inwardly therefrom is a cylindrical air chamber 15, formed preferably of rubber and expansible lengthwise. This expansibility derives from forming said chamber in its end portion adjacent to the valve member with one or more annular corrugations 16. It is preferred, as shown, to dispose the inner end portion of the valve member within and cement it to the outer end of the chamber 15. To admit air to the chamber 15 a passage 17 extends from the inner face of the valve member to the seating portion of its conical face, whereby said passage is closed or opened according as the valve member engages or disengages its seat. The chamber 15 is disposed within and reinforced by a cylindrical jacket 18 having a closed inner end, said jacket being sufficiently spaced inwardly from the tube 3 to provide for adequate air delivery to the tire. Said jacket may be formed of any suitable light sheet material such as metal or a plastic, lacking in material elasticity. It is preferred to cement or otherwise secure the entire non-corrugated peripheral portion of the container to the jacket and to similarly secure to each other the inner ends of the container and jacket. It is further preferred to form the jacket with an outward extension 18a beyond the chamber 15, such extension surrounding the inner portion of the valve member when normal pressure prevails in the tire. The extension 18a, or some other annular portion of the jacket 18 is exteriorly colored red, or some other conspicuous color, and the coloring material is preferably luminous so that the indicator may function in darkness. Such colored portion is concealed, when tire pressure is normal, by an opaque coating 19 of paint or other material applied to the tube 3. The flange 6 is threaded for engagement by the usual stem cap 20 which may seat against the gasket 7 to assure an air seal.

In use of the described indicator, equal pressures normally prevail within and around the jacketed chamber 15, such pressures being that which the tire is designed to carry. Under such conditions the chamber 15 is collapsed, as in Fig. 1, being biased by its resiliency to that position. In such position, there is complete concealment of the colored warning portion 18a of the jacket by the opaque coating 19 of the tube 3. When pressure in the tire drops due to leakage or any other cause, the balance of pressures is disturbed and there results an expansion of the chamber 15. The amount of expansion depends of course on pressure depletion in the tire and further depends on the collapsed length of the chamber 15. That is to say, the extent to which said chamber expands responsive to any pressure drop in the tire may (by Boyle's law) be increased or diminished by increasing or diminishing the length and hence the volume of said chamber. Thus by preselecting a proper length, the chamber may be adapted to undergo a certain desired expansion for a predetermined depletion of tire pressure. As the chamber expands, it shifts the jacket 18 inwardly and registers the signal portion 18a of the jacket either partially or fully with the window formed by the uncoated portion of the tube 3. Thus the device not only provides a visual indication of depleted pressure but further shows at least approximately the amount of depletion.

The jacket 18 performs an important function in reinforcing the chamber 15 and preventing material circumferential expansion thereof. Thus the elastic tension of the confined air is made fully effective lengthwise of the valve stem and there is avoided such wear and frictional resistance as would be imposed on the chamber 15 were it permitted by circumferential expansion to exert outward pressure on the tube 3.

Fig. 4 discloses an indicating unit comprising a valve member 9', expansible chamber 15', and a jacket 18', which unit is slightly modified from the construction first described. This modification consists merely in omitting the port 17 of the valve member whereby air at a predetermined pressure is permanently sealed within the expansible chamber. The pressure employed would of course be that best suited to the tire in the valve stem of which said unit is to be installed. The modified unit will respond expansively to depleted tire pressure just as in the first described construction. It is realized that various types of pressure indicators have been designed for installation on the removable screw caps of tire valve stems. These, however, are open to the objection that such caps may be easily stolen or lost. The construction now described is preferable further because of its superior simplicity and of the thorough protection from damage derived from its location within the valve stem.

An important merit of the construction shown in Fig. 4, which permanently seals a body of gas in the expansible chamber at a pressure for which the tire is designed, lies in the fact that the indicating extension 18'a of the jacket progressively shifts to a hidden position as a requisite pressure is built up by inflation. Thus when said extension becomes fully hidden, inflation may be discontinued, without need of consulting any gauge on the hose or applying a test gauge.

It is a distinctive and valuable feature of the disclosed indicator, in either illustrated form, that balanced pressures are produced between two volumes of air rather than between air and a spring. The indications derived from a spring opposed to pressure in a tire may suffer a considerable loss of accuracy due to temperature-induced pressure variations of the air. This element of error is eliminated when pressures of two volumes of air are opposed, since they respond alike to temperature variations.

What I claim is:

1. In a low pressure tire signal, the combination with a tire valve stem and its valve, of an expansible chamber carried by said valve and extending toward the inner end of the stem, said chamber confining a compressed gas and, when non-expanded, maintaining such gas at a pressure equal to that desired in the tire, said chamber being exteriorly subject to the pressure prevailing in the tire, and a signal element movable by said chamber upon its expansion due to a depletion of the tire pressure.

2. In a low pressure tire signal, the combination with a tire valve stem having a transparent portion, of a movable signal element within said stem positioned to be observed through said transparent portion in at least one position of such element, an expansible actuator for said signal element disposed within the stem, and exercising an expansive effort, such effort being counterbalanced by the pressure of air in the tire and stem when such pressure is normal, and being adapted to overcome such pressure when it is subnormal, and an anchorage provision for said actuator.

3. In a low pressure tire signal as set forth in claim 2, a valve member in said stem controlling delivery of air to the tire, and forming said anchorage provision.

4. In a low pressure tire signal, the combination with a tire valve stem, a compressed air chamber within said stem expansible and exercising an expansive effort toward the inner end of the stem, and opposed in such effort by the pressure of air in the tire and stem, means substantially fixing a portion of said chamber with respect to the stem, a valve controlling both the admission of air to the tire and to said air chamber, and a signal element movable by said air chamber in its expansion.

5. In a low pressure tire signal, the combination with a tire valve stem, of a member within said stem having a port for delivery of air to the tire, a valve member normally closing said port, a compressed air chamber carried by said valve member and expansible toward the inner end of the stem but restrained from such expansion by pressure in the tire and stem when such pressure is normal, the valve member having a passage for delivering air to said air chamber, the inlet of said passage being in the seating face of the valve member and hence closed when the valve member is seated, and a signal element actuable by expansive travel of the air chamber.

6. In a low pressure tire signal, the combination with a tire valve stem having a tubular transparent portion, of a cylindrical element slidable within and lengthwise of said stem for effecting exposure of a signal through said transparent portion, an expansible actuator for said element within the stem, exercising an expansive effort, such effort being counterbalanced by the pressure of air in the tire and stem when such pressure is normal and overcoming such pressure when it is subnormal, and means substantially fixing a portion of said actuator with respect to the stem.

7. In a low pressure tire signal, the combination with a tubular valve stem having a transparent portion and an air passage extended through such portion, of a valve member mounted in and controlling air delivery through such passage, and a low pressure indicator operatively disposed within the stem including a signal exposed through said transparent portion.

8. A low pressure tire signal as set forth in claim 7, said signal being disposed between the tire and said valve member and in the air passage controlled by the valve member.

9. A low pressure tire signal as set forth in claim 7, said signal being cylindrical and substantially coaxial with the stem.

10. In an indicator, the combination with a tire valve stem and a valve assembly inserted in the stem and comprising a member ported for air delivery to the tire, a valve member seating on the ported member to resist air escape, and means yieldably urging the valve member to its seat, of pressure indicating means fully carried by the valve member within the stem, the stem having a transparent portion to expose said means.

11. In a low pressure tire signal, the combination with a tubular valve stem having a flexible tire-engaging portion and a substantially rigid extension from said portion including a transparency, the joint between said flexible portion and extension being impermeable to air, of a valve member mounted in said extension and controlling air delivery through the stem, and a low pressure indicator operatively disposed within the stem including a signal exposed through said transparency.

12. In a low pressure tire signal, the combination with a pneumatic tire and a tubular stem communicating with and extending from the tire, of a chamber within and elongated lengthwise of the stem, confining a gas under a pressure substantially equal to that desired in the tire, means for anchoring one end of said chamber, the chamber being expansible to withdraw its other end from said anchoring means and being resisted in such expansion by air in the stem at tire pressure, and a signal movable within the stem by expansion of said chamber, the stem being transparent for at least a portion of its length to expose said signal.

13. In a low pressure tire signal as set forth in claim 12, said chamber having an inlet thereto, means for admitting air to said chamber responsive to a material increase of air pressure in the stem over that of the gas within the chamber.

14. A low pressure tire signal as set forth in claim 12, said signal being cylindrical and at least partially confining said chamber and resisting its lateral expansion.

15. A low pressure tire signal as set forth in claim 12, said chamber being expansible toward the tire-engaging end of the stem.

16. In a low pressure tire signal, the combination with a pneumatic tire having a provision for correcting pressure depletion, of a low pressure signal, a chamber for confining air at the pressure desired in the tire expansible to actuate said signal and opposed in its expansion by the pressure of air in the tire, means anchoring a portion of said chamber, and means for correcting any pressure depletion in said chamber responsive to correction of pressure depletion in the tire.

17. In a low pressure tire signal, the combination with a pneumatic tire, of a stem forming a passage for air delivery to said tire and having a transparent portion surrounding said passage, a movable signal within said passage positioned to be observed through said transparent portion in at least one position of such signal, and means for moving said signal responsive to a depletion of tire pressure.

18. In a low pressure tire signal, the combination with a tire valve stem and its valve, of signal means including an expansible chamber carried by said valve and extending toward the inner end of the stem, said chamber confining a compressed gas and, when non-expanded, maintaining such gas at a pressure equal to that desired in the tire, said chamber being exteriorly subject to the pressure prevailing in the tire.

19. In a low pressure tire signal, the combination with a tire valve stem having a transparent portion, of movable signal means within said stem, including a part positioned to be observed through said transparent portion in at least one position of such part, and including an expansible member exercising an expansive effort and normally counterbalanced in such effort by the pressure of air in the tire and stem, and adapted to overcome such pressure when it is subnormal, and means for substantially anchoring a portion of said expansible member with respect to the stem.

20. In a low pressure tire signal, the combination with a tire valve stem, of signal means including a compressed air chamber within said stem expansible and exercising an expansive effort toward the inner end of the stem, and opposed in such effort by the pressure of air in the tire and stem, an anchorage provision for said chamber, and a valve controlling both the admission of air to the tire and to said air chamber.

21. In a low pressure tire signal, the combination with a tire valve stem, of a member within said stem having a port for delivery of air to the tire, a valve member normally closing said port, and signal means including a compressed air chamber carried by said valve member and expansible toward the inner end of the stem but restrained from expansion by pressure in the tire and stem when such pressure is normal, the valve member having a passage for delivering air to said air chamber, the inlet of said passage being in the seating face of the valve member and hence closed when the valve member is seated.

22. In a low pressure tire signal, the combination with a pneumatic tire and a tubular stem communicating with and extending from the tire, of signal means including an expansible chamber within and elongated lengthwise of the stem and confining a gas under a pressure substantially equal to that desired in the tire, and an anchorage provision for an end of said chamber, expansion of the chamber being resisted by air in the stem at tire pressure, the stem being transparent for at least a portion of its length to expose a part of said signal means.

HAROLD G. RENNER.

REFERENCES CITED

The following references are of record in the file of this patent:

UNITED STATES PATENTS

| Number | Name | Date |
|---|---|---|
| 762,299 | Fulton | June 14, 1904 |
| 1,249,112 | Keister | Dec. 4, 1917 |
| 1,400,848 | Anderson | Dec. 20, 1921 |
| 1,539,030 | Sweetland | May 26, 1925 |
| 1,570,397 | Preston | Jan. 19, 1926 |
| 1,582,523 | Larson | Apr. 27, 1926 |
| 1,606,740 | Badowski | Nov. 16, 1926 |
| 1,755,163 | Pulverman | Apr. 15, 1930 |
| 1,807,752 | Poster | June 2, 1931 |
| 1,856,199 | Tagle et al. | May 3, 1932 |
| 2,154,901 | Hulse | Apr. 18, 1939 |
| 2,225,674 | West | Dec. 24, 1940 |
| 2,229,192 | Schultz | Jan. 21, 1941 |